United States Patent
Lee et al.

(10) Patent No.: US 10,502,048 B2
(45) Date of Patent: Dec. 10, 2019

(54) CASING COLLAR LOCATOR

(71) Applicant: G&H Diversified Manufacturing LP, Houston, TX (US)

(72) Inventors: Timmothy Alain Lee, Spring, TX (US); Joe Noel Wells, Lindale, TX (US)

(73) Assignee: G&H Diversified Manufacturing LP, Houston, TX (US)

( * ) Notice: Subject to any disclaimer, the term of this patent is extended or adjusted under 35 U.S.C. 154(b) by 302 days.

(21) Appl. No.: 14/829,204

(22) Filed: Aug. 18, 2015

(65) Prior Publication Data
US 2017/0051603 A1  Feb. 23, 2017

(51) Int. Cl.
*E21B 47/09* (2012.01)
*G01V 3/26* (2006.01)
*G01V 3/28* (2006.01)

(52) U.S. Cl.
CPC ............ *E21B 47/0905* (2013.01); *G01V 3/26* (2013.01); *G01V 3/28* (2013.01)

(58) Field of Classification Search
CPC .... E21B 17/003; E21B 17/021; E21B 17/023; E21B 17/026; E21B 17/028; E21B 17/08; E21B 17/16; E21B 47/01; E21B 47/011; E21B 47/0905; E21B 47/091; E21B 47/0915; E21B 47/09; G01V 3/18; G01V 3/26; G01V 3/28; G01V 3/0818; G01V 11/002
USPC .................. 175/4.51, 45; 324/221, 333–345; 166/250.01, 255.1, 255.2, 65.1, 66, 66.5; 250/257; 340/854.2, 854.9, 855.1, 855.2
See application file for complete search history.

(56) References Cited

U.S. PATENT DOCUMENTS

| | | | | |
|---|---|---|---|---|
| 2,177,100 A | * | 10/1939 | Frame | F16L 15/001 285/334 |
| 2,946,926 A | * | 7/1960 | Hawthorne | E21B 43/1185 324/221 |
| 3,105,548 A | * | 10/1963 | Ownby | E21B 23/02 166/123 |
| 3,176,770 A | * | 4/1965 | Ehlert | E21B 43/112 166/55.1 |
| 3,403,328 A | * | 9/1968 | Fossati | G01V 1/52 324/338 |
| 3,923,324 A | * | 12/1975 | Cruickshank | E21B 17/042 175/325.2 |
| 4,660,910 A | * | 4/1987 | Sharp | E21B 17/028 439/194 |
| 5,160,925 A | * | 11/1992 | Dailey | E21B 47/011 175/40 |
| 5,358,418 A | * | 10/1994 | Carmichael | E21B 17/028 166/65.1 |

(Continued)

*Primary Examiner* — Steven L Yeninas
(74) *Attorney, Agent, or Firm* — Conley Rose, P.C.

(57) ABSTRACT

A casing collar locator including a housing having a first end, a second end, and a passage extending between the first end and the second end, a first cylindrical member having a passage extending therethrough and coupled to the first end of the housing, and a second cylindrical member having a passage extending therethrough and coupled to the second end of the housing, and a coil assembly disposed in the passage of the housing and configured to produce an electrical signal in response to a change in a magnetic field, wherein the coil assembly comprises an annular magnet having a diameter greater than an axial width of the annular magnet.

20 Claims, 8 Drawing Sheets

(56) References Cited

U.S. PATENT DOCUMENTS

| | | | | |
|---|---|---|---|---|
| 6,084,403 | A * | 7/2000 | Sinclair | E21B 47/0905 166/255.1 |
| 6,196,325 | B1 * | 3/2001 | Connell | E21B 17/023 166/242.6 |
| 6,429,653 | B1 * | 8/2002 | Kruspe | E21B 47/011 324/300 |
| 2002/0064011 | A1 * | 5/2002 | Loechner | G05B 19/0428 361/92 |
| 2005/0016769 | A1 * | 1/2005 | Wallace | H01R 13/523 175/40 |
| 2006/0073722 | A1 * | 4/2006 | Allan | E21B 17/028 439/246 |
| 2009/0250213 | A1 * | 10/2009 | Kalb | G01R 33/0322 166/255.1 |
| 2010/0147590 | A1 * | 6/2010 | Morley | E21B 17/1078 175/50 |
| 2015/0211307 | A1 * | 7/2015 | Minosyan | E21B 17/003 166/66 |

\* cited by examiner

CASING COLLAR LOCATOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

After a wellbore has been drilled through a subterranean formation, the wellbore may be cased by inserting lengths of pipe ("casing sections") connected end-to-end into the wellbore. Threaded exterior connectors known as casing collars may be used to connect adjacent ends of the casing sections at casing joints, providing a casing string including casing sections and connecting casing collars that extends from the surface towards the bottom of the wellbore. The casing string may then be cemented into place to secure the casing string within the wellbore.

Following the casing of the wellbore, the casing string may be perforated using a perforating gun to provide for fluid communication between the wellbore and the formation at desired locations, necessitating the ability to accurately position the perforating gun at the desired location within the wellbore. Therefore, a tool known as a casing collar locator (CCL) may be run into the wellbore along with the perforating gun on a wireline to confirm or correlate service depth using known reference points on the casing string. Particularly, as the CCL passes through a casing collar of the casing string, the magnetic lines of flux from the magnets are distorted, inducing a current in the coiled conductor known as a collar that is transmitted to the surface and recorded as a collar "kick". The collar kick may be recorded in conjunction with a gamma ray or neutron porosity log to correlate the position of the casing collar (i.e., "cased hole log") with the spontaneous potential (SP) or gamma ray signal of an open hole log. Following the correlation of the cased hole log with the open hole log, service depth may be determined by counting the casing collars of the casing string using the CCL as the CCL is displaced through the casing string.

SUMMARY

An embodiment of a casing collar locator comprises a housing having a first end, a second end, and a passage extending between the first end and the second end, a first cylindrical member having a passage extending therethrough and coupled to the first end of the housing, and a second cylindrical member having a passage extending therethrough and coupled to the second end of the housing, a coil assembly disposed in the passage of the housing and configured to produce an electrical signal in response to a change in a magnetic field, a first pressure bulkhead disposed in the passage of the first cylindrical member and comprising an annular seal to restrict fluid communication through the passage of the first cylindrical member, and a second pressure bulkhead disposed in the passage of the second cylindrical member and comprising an annular seal to restrict fluid communication through the passage of the second cylindrical member, wherein the first pressure bulkhead and the second pressure bulkhead each comprise an electrical connector. In an embodiment, the first cylindrical member comprises a plurality of circumferentially spaced inserts extending radially from an outer surface of the first cylindrical member, and the second cylindrical member comprises a plurality of circumferentially spaced inserts extending radially from an outer surface of the second cylindrical member. In an embodiment, the inserts of the first cylindrical member and the inserts of the second cylindrical member comprise tungsten carbide. In some embodiments, the coil assembly comprises an annular magnet having a diameter greater than an axial width of the annular magnet. In some embodiments, the annular magnet comprises Neodymium. In an embodiment, the coil assembly comprises two wires wound in parallel about a coil form. In an embodiment, the casing collar locator further comprises a diode assembly electrically connected to the coil assembly, wherein the diode assembly comprises a first lead and a second lead, a first plurality of series-connected diodes connected with a positive polarity between the first and second leads, a second plurality of series-connected diodes connected with a negative polarity between the first and second leads and in parallel with the first plurality of series-connected diodes.

An embodiment of a casing collar locator comprises a housing having a first end, a second end, and a passage extending between the first end and the second end, a first cylindrical member having a passage extending therethrough and coupled to the first end of the housing, and a second cylindrical member having a passage extending therethrough and coupled to the second end of the housing, and a coil assembly disposed in the passage of the housing and configured to produce an electrical signal in response to a change in a magnetic field, wherein the first cylindrical member comprises a plurality of circumferentially spaced inserts extending radially from an outer surface of the first cylindrical member, and wherein the second cylindrical member comprises a plurality of circumferentially spaced inserts extending radially from an outer surface of the second cylindrical member. In an embodiment, the inserts of the first cylindrical member and the inserts of the second cylindrical member comprise tungsten carbide. In an embodiment, the casing collar locator further comprises a first pressure bulkhead disposed in the passage of the first cylindrical member and comprising an annular seal to restrict fluid communication through the passage of the first cylindrical member, and a second pressure bulkhead disposed in the passage of the second cylindrical member and comprising an annular seal to restrict fluid communication through the passage of the second cylindrical member, wherein the first pressure bulkhead and the second pressure bulkhead each comprise an electrical connector. In some embodiments, the coil assembly comprises an annular magnet having a diameter greater than an axial width of the annular magnet. In an embodiment, the coil assembly comprises two wires wound in parallel about a coil form. In an embodiment, the coil assembly comprises a coil form having a coil wrapped around the coil form, and a plurality of circumferentially spaced grounding members coupled to the coil form, wherein the grounding members are biased into engagement with the housing.

An embodiment of a casing collar locator comprises a housing having a first end, a second end, and a passage extending between the first end and the second end, a first cylindrical member having a passage extending therethrough and coupled to the first end of the housing, and a second cylindrical member having a passage extending therethrough and coupled to the second end of the housing, and a coil assembly disposed in the passage of the housing and configured to produce an electrical signal in response to a change in a magnetic field, wherein the coil assembly comprises an annular magnet having a diameter greater than an axial width of the annular magnet. In an embodiment, the annular magnet comprises Neodymium. In an embodiment, the casing collar locator further comprises a first pressure bulkhead disposed in the passage of the first cylindrical member and comprising an annular seal to restrict fluid communication through the passage of the first cylindrical member, and a second pressure bulkhead disposed in the passage of the second cylindrical member and comprising an annular seal to restrict fluid communication through the passage of the second cylindrical member, wherein the first pressure bulkhead and the second pressure bulkhead each comprise an electrical connector. In some embodiments, the first cylindrical member comprises a plurality of circumferentially spaced inserts extending radially from an outer surface of the first cylindrical member, and wherein the second cylindrical member comprises a plurality of circumferentially spaced inserts extending radially from an outer surface of the second cylindrical member. In some embodiments, the inserts of the first cylindrical member and the inserts of the second cylindrical member comprise tungsten carbide. In an embodiment, the coil assembly comprises two wires wound in parallel about a coil form. In an embodiment, the first cylindrical member comprises a threaded connector having Acme threads for coupling the casing collar locator to a tool.

BRIEF DESCRIPTION OF THE DRAWINGS

For a detailed description of the preferred embodiments of the disclosure, reference will now be made to the accompanying drawings in which.

DETAILED DESCRIPTION

Figure 1:
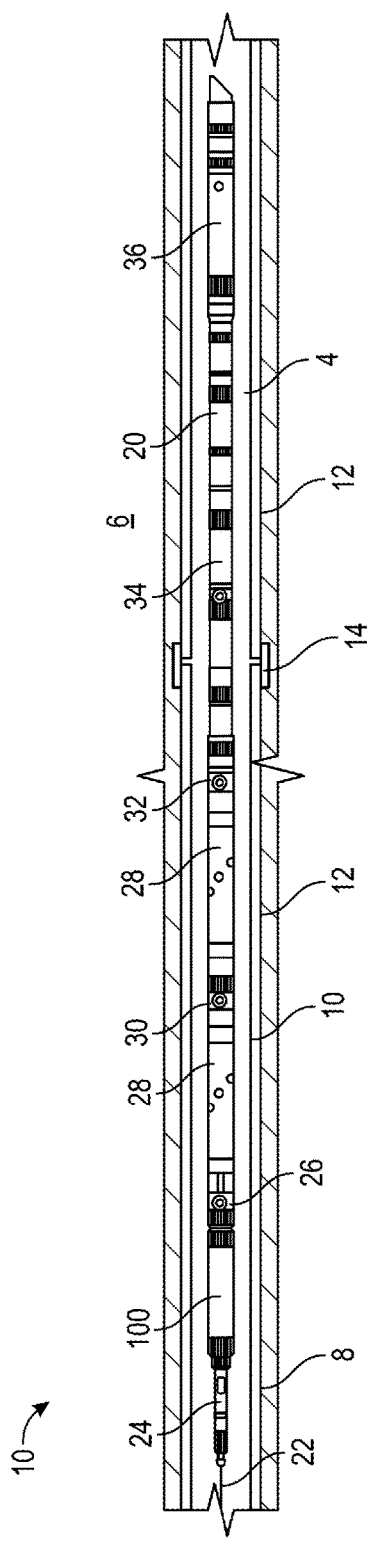
FIG. 1 is a schematic, partial cross-sectional view of a system for completing a subterranean well including an embodiment of a casing collar locator in accordance with the principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. Further, the term "fluid," as used herein, is intended to encompass both fluids and gasses.

Referring now to FIG. 1, a system 10 for completing a wellbore 4 extending into a subterranean formation 6 is shown. In the embodiment of FIG. 1, wellbore 4 is a cased wellbore including a casing string 10 secured to an inner surface 8 of the wellbore 4 using cement (not shown). Casing string 10 generally includes a plurality of tubular segments 12 coupled together via a casing collar 14. As shown schematically in FIG. 1, the radial thickness of casing string 10 is increased at casing collar 14 by the overlap between casing collar 14 and the terminal ends of tubular segments 12.

In this embodiment, system 10 includes a tool string 20 disposed within wellbore 4 and suspended from a wireline 22 that extends to the surface of wellbore 4. Wireline 22 comprises an armored cable and includes at least one electrical conductor for transmitting power and electrical signals between tool string 20 and the surface. System 10 may further include suitable surface equipment for drilling, completing, and/or operating system 10 and may include, in some embodiments, derricks, structures, pumps, electrical/mechanical well control components, etc. Tool string 20 is generally configured to perforate casing string 10 to provide for fluid communication between formation 6 and wellbore 4 at predetermined locations.

In the embodiment shown in FIG. 1, tool string 20 generally includes a cable head 24, a casing collar locator (CCL) 100, a direct connect sub 26, a plurality of perforating guns 28, a switch sub 30, a plug-shoot firing head 32, a setting tool 34, and a plug 36. Cable head 24 is the uppermost component of tool string 20 and includes an electrical connector for providing electrical signal and power communication between the wireline 22 and the other components (CCL 100, perforating guns 28, etc.) of tool string 20. CCL 100, as will be described further herein, is coupled to a lower end of the cable head 24 and is generally configured to transmit an electrical signal to the surface via wireline 22 when CCL 100 passes through casing collar 14, where the transmitted signal may be recorded at the surface as a collar kick, as discussed above, to determine the position of tool string 20 within wellbore 4 by correlating the recorded collar kick with an open hole log. The direct connect sub 26 is coupled to a lower end of CCL 100 and is generally configured to provide a connection between the CCL 100 and the portion of tool string 20 including the perforating guns 28 and associated tools, such as the setting tool 34 and plug 36.

Perforating guns 28 of tool string 20 are coupled to direct connect sub 26 and are generally configured to perforate casing string 10 and provide for fluid communication between formation 6 and wellbore 4. Particularly, perforating guns 28 include a plurality of shaped charges that may be detonated by a signal conveyed by the wireline 22 to produce an explosive jet directed against casing string 10. Perforating guns 28 may be any suitable perforation gun known in the art while still complying with the principles disclosed herein. For example, in some embodiments, perforating guns 28 may comprise a hollow steel carrier (HSC) type perforating gun, a scalloped perforating gun, or a retrievable tubing gun (RTG) type perforating gun. In addition, gun 28 may comprise a wide variety of sizes such as, for example, 2¾", 3⅛", or 3⅜", wherein the above listed size designations correspond to an outer diameter of perforating guns 28.

Switch sub 30 of tool string 20 is coupled between the pair of perforating guns 28 and includes an electrical conductor and switch generally configured to allow for the passage of an electrical signal to the lowermost perforating gun 28 of tool string 20. Tool string 20 further includes plug-shoot firing head 32 coupled to a lower end of the lowermost perforating gun 28. Plug-shoot firing head 32 couples the perforating guns 28 of the tool string 20 to the setting tool 34 and plug 36, and is generally configured to pass a signal from the wireline 22 to the setting tool 34 of tool string 20. Plug-shoot firing head 32 may also include mechanical and/or electrical components to fire the setting tool 34.

In the embodiment shown in FIG. 1, tool string 20 further includes setting tool 34 and plug 36, where setting tool 34 is coupled to a lower end of plug-shoot firing head 32 and is generally configured to set or install plug 36 within casing string 10 to isolate desired segments of the wellbore 4. Once plug 36 has been set by setting tool 34, an outer surface of plug 36 seals against an inner surface of casing string 10 to restrict fluid communication through wellbore 4 across plug 36. Setting tool 34 of tool string 20 may be any suitable setting tool known in the art while still complying with the principles disclosed herein. For example, in some embodiments, tool 34 may comprise a #10 or #20 Baker style setting tool. In addition, setting tool 34 may comprise a wide variety of sizes such as, for example, 1.68 in., 2.125 in., 2.75 in., 3.5 in., 3.625 in., or 4 in., wherein the above listed sizes correspond to the overall outer diameter of the tool. Although CCL 100 is shown in FIG. 1 as incorporated in tool string 20, CCL 100 may be used in other tool strings comprising components differing from the components comprising tool string 20.

Figure 2:
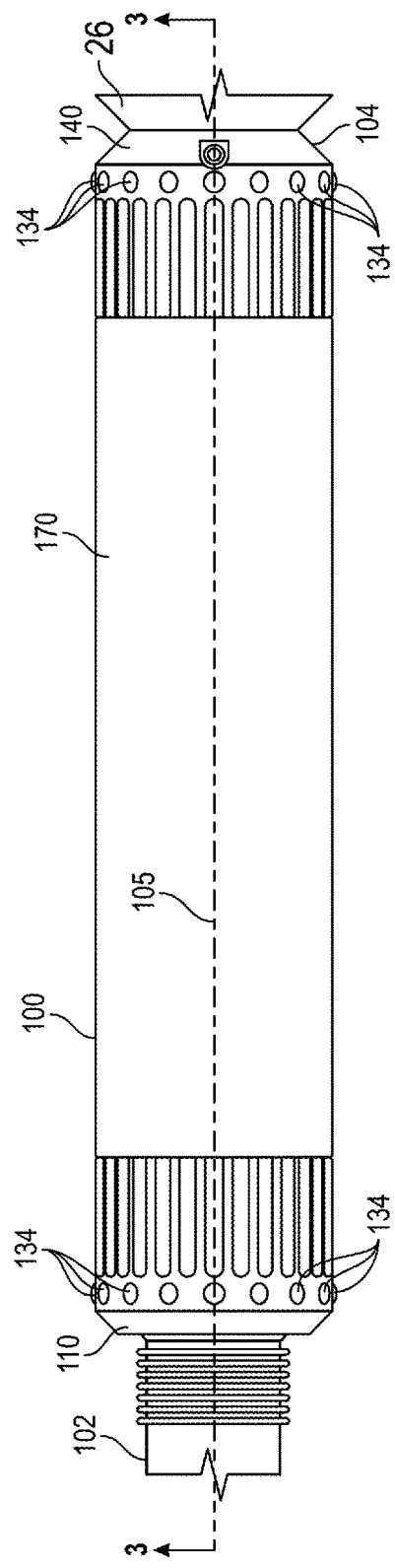
FIG. 2 is a side view of the casing collar locator of FIG. 1.
Figure 3:
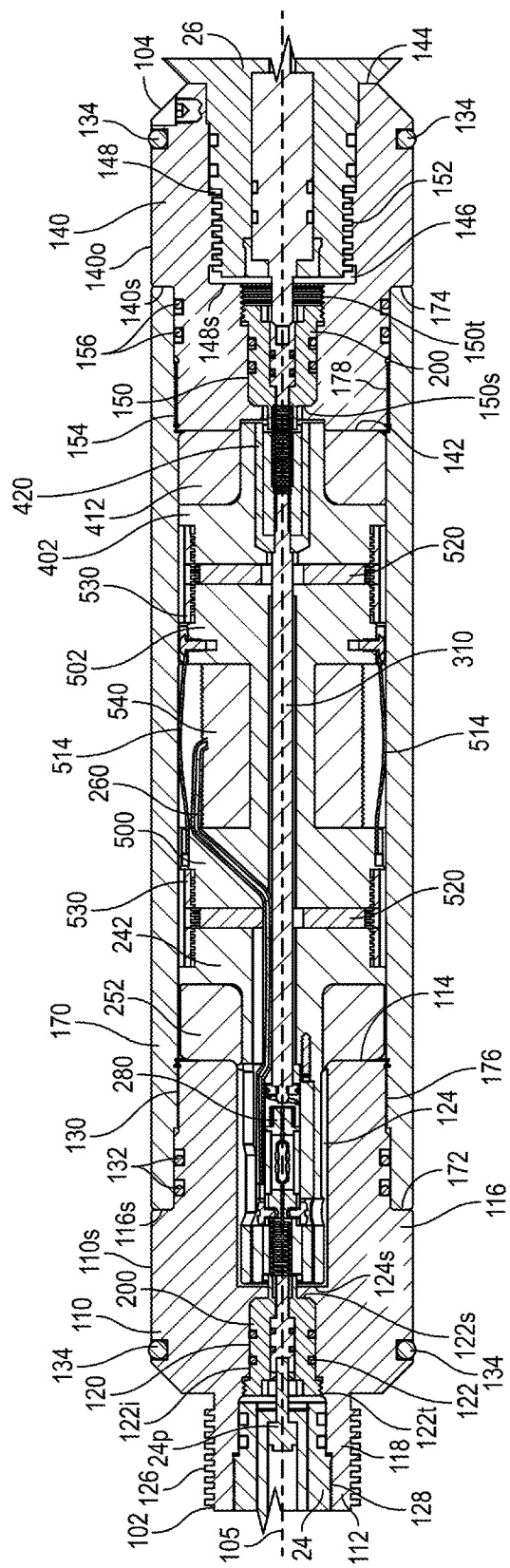
FIG. 3 is a side cross-sectional view along lines 3-3 of FIG. 2 of the casing collar locator of FIG. 1.

Referring to FIGS. 2 and 3, CCL 100 has a central or longitudinal axis 105, a first or upper end 102, and a second or lower end 104. In this embodiment, CCL 100 generally includes a first or upper sub assembly 110, a second or lower sub assembly 140, and a housing 170 coupled between upper sub assembly 110 and lower sub assembly 140. Upper sub assembly 110 is disposed coaxially with longitudinal axis 105 and has a first or upper end 112, and a second or lower end 114. Upper sub assembly 110 may comprise 4340 Alloy Steel or other materials known in the art suitable for service in a wellbore, and the outer surfaces of upper sub assembly 110 may have a finish applied thereon for providing corrosion resistance to maximize the service life of upper sub assembly 110. Upper sub assembly 110 generally includes a body 116 extending from lower end 114, and a neck 118 extending from the body 116 to the upper end 112 of upper sub assembly 110. Upper sub assembly 110 includes a passage or throughbore 120 extending between upper end 112 and lower end 114. Body 116 of upper sub assembly 110 also includes a first or upper passage or counterbore 122 extending from an upper end of body 116 and a second or lower passage or counterbore 124 extending into body 116 from the lower end 114 of upper sub assembly 110. Upper counterbore 122 forms an annular shoulder 122s at a lower end thereof and lower counterbore 124 forms an annular shoulder 124 at an upper end thereof. Upper counterbore 122 also includes a threaded connector 122t disposed on an inner surface 122i thereof and located axially at the upper end of body 116.

Neck 118 of upper sub assembly 110 includes an external threaded connector 126 disposed on an outer cylindrical surface thereof and an internal threaded connector 128 disposed on an inner surface of throughbore 120. In this embodiment, threaded connector 126 comprises threads (e.g., Acme threads), similar to the thread-type used in other downhole tools. Internal threaded connector 128 is generally configured to threadably couple with a lower end of cable head 24 that is received within throughbore 120, as will be discussed further herein. In this embodiment, threaded connector 128 comprises threads (e.g., UN Unified National threads), similar to the thread-type used in other downhole tools. External threaded connector 126 is generally configured to threadably couple with a weight bar or sinker bar (not shown) disposed about externally over cable head 24. Weight bars may be used in tool strings, such as tool string 20 shown in FIG. 1, to add weight to the tool string to overcome buoyancy forces from fluid disposed within a wellbore.

In this embodiment, body 116 of upper sub assembly 110 includes a downward facing annular shoulder 116s axially spaced from lower end 114 and an external threaded connector 130 disposed at lower end 114 for threadably coupling with a corresponding threaded connector of the housing 170 of CCL 100. Body 116 also includes a pair of annular seals 132 disposed in corresponding grooves that extend into the outer surface of body 116. Annular seals 132 are disposed axially between shoulder 116s and external threaded connector 130 and are generally configured to restrict fluid communication through the interface between the outer surface of body 116 and an inner surface of housing 170 of CCL 100. Annular seals 132 may comprise Nitrile, Viton®, or other sealing materials known in the art suitable for wellbore conditions.

Body 116 of upper sub assembly 110 further includes a plurality of circumferentially spaced inserts 134 extending radially from the outer surface 110s of body 116 and disposed axially adjacent the upper end of body 116. Each insert 134 includes a radially outer hemispherical end and a radially inner end brazed with a silver based alloy in a corresponding bore extending radially into the outer surface 110s of body 116 to fixably couple each insert 134 to body 116. However, in other embodiments inserts 134 may be affixed to body 116 using other techniques known in the art, or may be removably coupled to body 116. Inserts 134 are generally configured to reduce wear on the CCL 100 during operation within wellbore 4. Specifically, as CCL 100 is displaced through wellbore 4 the outer surface of CCL 100 may contact and wear against an inner surface of casing string 10. Inserts 134 are formed from a harder and more wear resistant material than the material forming upper sub assembly 110, and thus, contact between the inner surface of casing string 10 and inserts 134 results in less wear to upper head sub 116 and housing 170 of CCL 100, thereby extending the service life of CCL 100. In this embodiment, inserts 134 are formed from tungsten carbide; however, in other embodiments inserts 134 may comprise other wear resistant materials known in the art.

Lower sub assembly 140 of CCL 100 is disposed coaxially with longitudinal axis 105 and has a first or upper end 142, and a second or lower beveled end 144. Lower sub assembly 140 may comprise 4340 Alloy Steel, or other materials known in the art suitable for service in a wellbore, and the outer surfaces of lower sub assembly 140 may have a finish applied thereon for providing corrosion resistance to maximize the service life of lower sub assembly 140. Lower sub assembly 140 includes a passage or throughbore 146 extending between upper end 142 and lower end 144. Lower sub assembly 140 also includes a first or lower passage or counterbore 148 extending from lower end 144 and forming an annular shoulder 148s at a terminal end thereof. Lower sub assembly 140 further includes a second or upper passage or counterbore 150 extending from the terminal end of lower counterbore 148; upper counterbore 150 includes a downwards facing annular shoulder 150s disposed therein and an inner surface 150i. Upper counterbore 150 also includes a threaded connector 150t disposed on an inner surface thereof at the lower end of upper counterbore 150.

In this embodiment, lower sub assembly 140 includes an internal threaded connector 152 disposed on an inner surface of counterbore 148. In this embodiment, internal threaded connector 152 comprises threads (e.g., Acme threads), similar to the thread-type used in other downhole tools. Internal threaded connector 152 is generally configured to threadably couple with an upper end of direct connect sub 24, which is received within lower counterbore 148, as will be discussed further herein. In this embodiment, lower sub assembly 140 also includes a set fastener extending radially into lower sub assembly 140 to restrict relative rotation between lower sub assembly 140 and an adjacent tool coupled with lower sub assembly 140. Lower sub assembly 140 also includes an upward facing annular shoulder 140s axially spaced from upper end 142 and an external threaded connector 154 disposed at upper end 142 for threadably coupling with a corresponding threaded connector of housing 170 of CCL 100. Lower sub assembly 140 also includes a pair of annular seals 156 disposed in corresponding grooves that extend into the outer surface 140o of lower sub assembly 140. Annular seals 156 may comprise Nitrile, Viton®, or other sealing materials known in the art suitable for wellbore conditions. Annular seals 156 are disposed axially between shoulder 140s and external threaded connector 154, and are generally configured to restrict fluid communication through the interface between the outer surface of lower sub assembly 140 and the inner surface of housing 170 of CCL 100.

Lower sub assembly 140 further includes a plurality of circumferentially spaced inserts 134 extending radially from the outer surface 140o of lower sub assembly 140 and disposed axially adjacent lower end 144 to reduce wear on CCL 100, as described above. Similar to the configuration of upper sub assembly 110, each insert 134 includes a radially outer hemispherical end and a radially inner end brazed with a silver based alloy in a corresponding bore extending radially into the outer surface 140o of lower sub assembly 140 to fixably couple each insert 134 to lower sub assembly 140. However, in other embodiments inserts 134 may be affixed to lower sub assembly 140 using other techniques known in the art, or may be removably coupled to lower sub assembly 140.

Housing 170 of CCL 100 is disposed coaxially with longitudinal axis 105 and has a first or upper end 172, and a second or lower end 174. Housing 170 is generally cylindrical in shape and is configured to house and protect the electrical and magnetic components of CCL 100. Housing 170 may comprise a nonmagnetic, nickel based alloy, or other materials known in the art suitable for service in a wellbore. Housing 170 includes a passage or throughbore 176 extending between upper end 172 and lower end 174. Housing 170 also includes a first or upper threaded connector 178 disposed on the inner surface of housing 170 proximal upper end 172, and a second or lower threaded connector 180 disposed on the inner surface of housing 170 proximal lower end 174. Upper threaded connector 178 is configured to threadably couple with internal threaded connector 130 of upper sub assembly 110 with annular seals 132 of upper sub assembly 110 sealingly engaging the inner surface of housing 170 at upper end 172. Lower threaded connector 180 is configured to threadably couple with internal threaded connector 154 of lower sub assembly 140 with annular seals 156 of lower sub assembly 140 sealingly engaging the inner surface of housing 170 at lower end 174.

Referring to FIGS. 3-7, the lower counterbore 124 of upper sub assembly 110 and the upper counterbore 150 of lower sub assembly 140 each receive a pressure bulkhead 200 disposed therein. Pressure bulkheads 200 are each configured to pass an electrical signal from a tool coupled to CCL 100 to the internal electrical components of CCL 100, as will be described further herein. Pressure bulkheads 200 are also each configured to seal the internal electrical components of CCL 100 from the wellbore, particularly in the event of a failure of the seals of the tools coupled with CCL 100. In this embodiment, pressure bulkhead 200 generally includes an outer insulating housing 210 and an electrical contact 230 disposed within insulating housing 210. Insulating housing 210 is generally configured to couple pressure bulkhead 200 to CCL 100 and insulate electrical contact 230 from either the upper sub assembly 110 or the lower sub assembly 140. In this embodiment, insulating housing 230 is formed from 30% glass filled Polyether ether ketone (PEEK); however, in other embodiments insulating housing 210 may comprise other suitable electrically insulating materials.

Insulating housing 210 of pressure bulkhead 200 is disposed coaxially with longitudinal axis 105 and has a first end 212, a second end 214, and a throughbore 216 extending therebetween. Insulating housing 210 includes an axially extending neck 218 at second end 214 forming an annular shoulder 210s. Insulating housing 210 also includes a radial flange 220 disposed at first end 212 that includes a threaded connector 222 disposed on an outer surface thereof for coupling insulating housing 210 to the CCL 100. Insulating housing 210 further includes a pair of annular seals 224 disposed in grooves that extend radially into an outer surface of insulating housing 210. Seals 224 are located axially between flange 220 and neck 218 of insulating housing 210. In this embodiment, seals 224 are elastomeric o-ring seals configured to restrict fluid communication between the insulating housing 210 and either the upper sub assembly 110 or the lower sub assembly 140.

Insulating housing 210 of pressure bulkhead 200 includes a counterbore 226 extending axially into throughbore 206 from first end 212, forming an annular shoulder 226s at a terminal end of counterbore 226. Counterbore 226 of insulating housing 210 is configured to receive electrical contact 230. Insulating housing 210 further includes a square hole 228 extending into insulating housing 210 from first end 212 for receiving a tool (e.g., a half inch square drive) for installing or removing the pressure bulkhead 200 from the CCL 100. Further, throughbore 216 of insulating housing 210 includes a threaded connector 216t on a portion of the inner surface of throughbore 216 located axially between neck 218 and the annular shoulder 226s of counterbore 226. Threaded connector 216t of throughbore 216 is configured to receive and threadably connect with a corresponding threaded connector of electrical contact 230.

Electrical contact or connector 230 is disposed within insulating housing 210 and is generally configured provide an electrical connection between wireline 22 and the electrical components disposed within CCL 100, as will be discussed further herein. In this embodiment, electrical contact 230 comprises Brass C360; however, in other embodiments electrical contact 230 may comprise other suitable conducting materials. In this embodiment, electrical contact 230 has a first end 232, a second end 234, and a bore 236 extending axially into electrical contact 230 from first end 232. Electrical contact 230 includes a neck 238 extending from second end 234 and forming an annular shoulder 238s at an end thereof. Neck 238 includes a threaded coupler 238t disposed on an outer surface thereof for threadably coupling with threaded connector 216t of the throughbore 216 of insulating housing 210.

Electrical contact 230 of pressure bulkhead 200 includes a pair of annular seals 237 disposed in grooves that extend radially into an outer surface of electrical contact 230. Seals 230 are located axially between first end 232 and the annular shoulder 238s. In this embodiment, seals 237 are elastomeric o-ring seals configured to restrict fluid communication between the insulating housing 210 and electrical contact 230. Electrical contact 230 also includes a contact spring 239 threadably coupled to the threaded connector 238t of neck 238. When electrical contact 230 is assembled in insulating housing 210, the contact spring 239 extends axially outwards from the portion of throughbore 216 disposed within neck 218. In this arrangement, contact spring 239 may form an electrical connection between electrical contact 230 of pressure bulkhead 200 and the internal electronics of CCL 100, as will be discussed further herein. In this embodiment, contact spring 239 is configured to provide a biasing force sufficient to maintain an electrical connection in wellbore service conditions.

Figure 4:
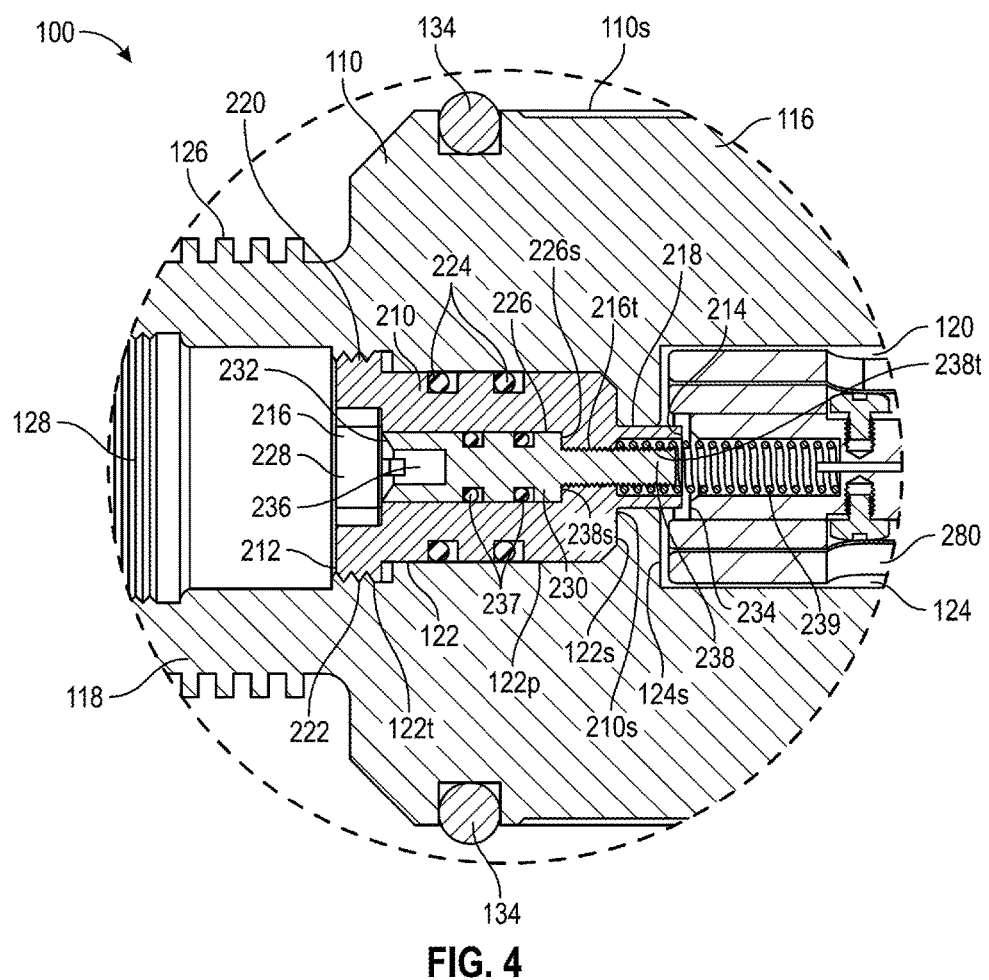
FIG. 4 is a zoomed-in view of a first end of the casing collar locator shown in FIG. 3.

As shown particularly in FIGS. 3 and 4, when CCL 100 is assembled a pressure bulkhead 200 is disposed within upper counterbore 122 of upper sub assembly 110. Particularly, annular shoulder 210s of insulating housing 210 is disposed adjacent annular shoulder 122s and threaded connector 222 of insulating housing 210 threadably couples with threaded connector 122t to secure pressure bulkhead 200 within upper sub assembly 110. Annular seals 224 seal against inner surface 122i of counterbore 122. Further, when CCL 100 is coupled to cable head 24 of tool string 20, an electrical pin contact 24p of cable head 24 is inserted into bore 236 of electrical contact 230 to form an electrical connection between cable head 24 and CCL 100.

Figure 5:
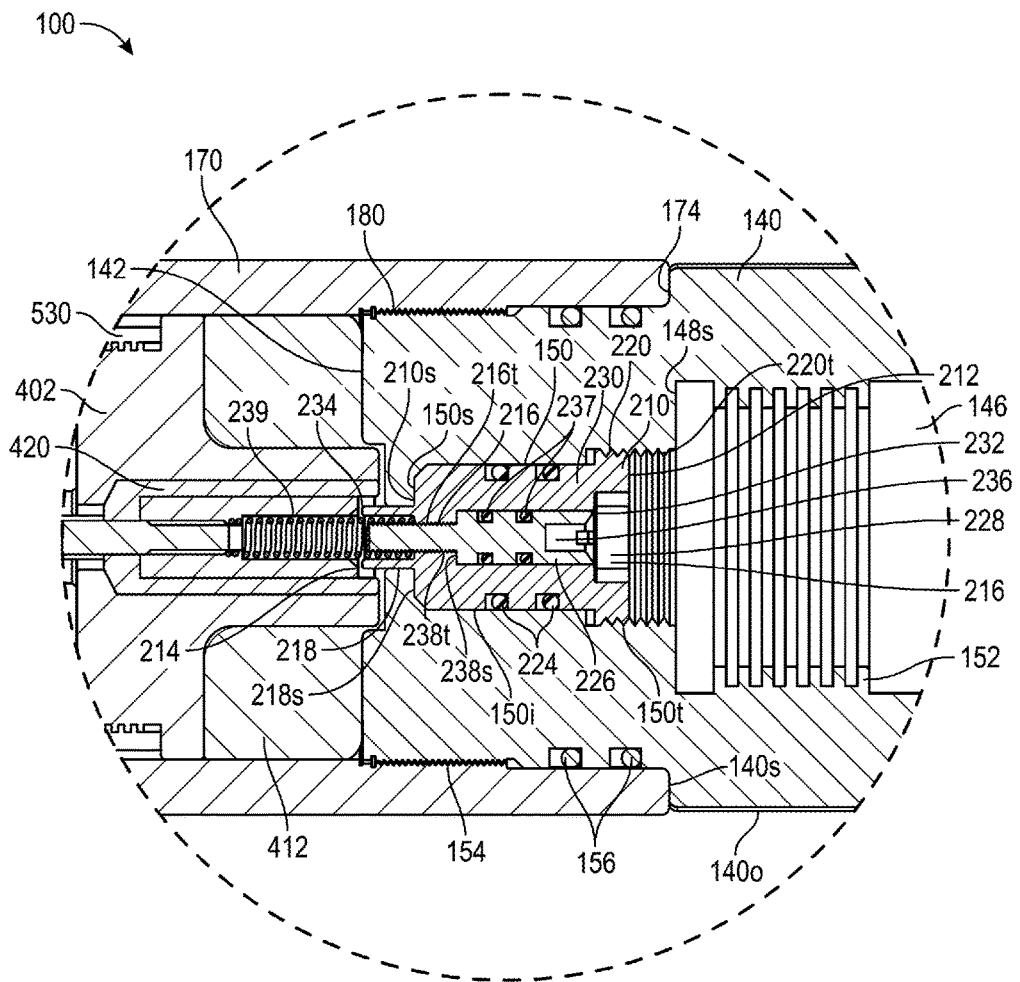
FIG. 5 is a zoomed-in view of a second end of the casing collar locator shown in FIG. 3.
Figure 6:
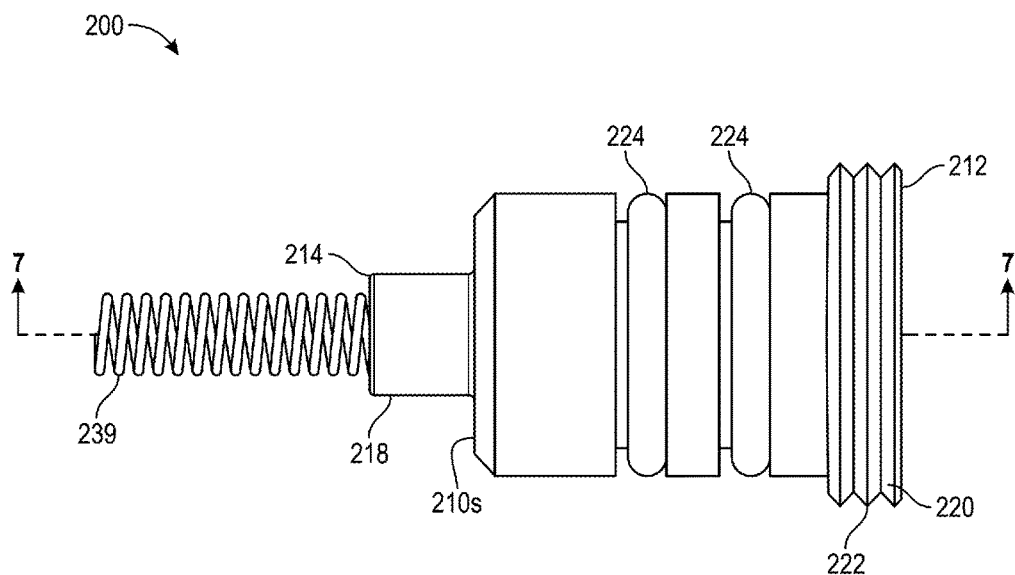
FIG. 6 is a side view of an embodiment of an embodiment of a pressure bulkhead of the casing collar locator of FIG. 1.
Figure 7:
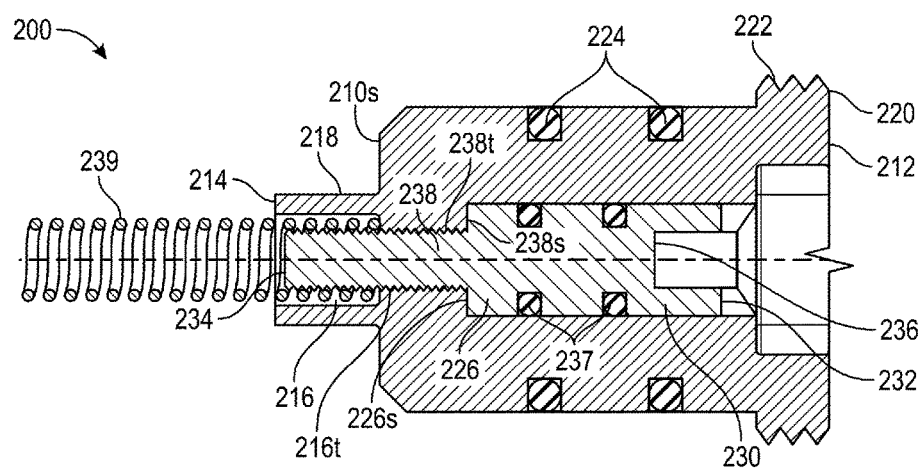
FIG. 7 is a side cross-sectional view along lines 7-7 of the pressure bulkhead of FIG. 6.
Figure 8:
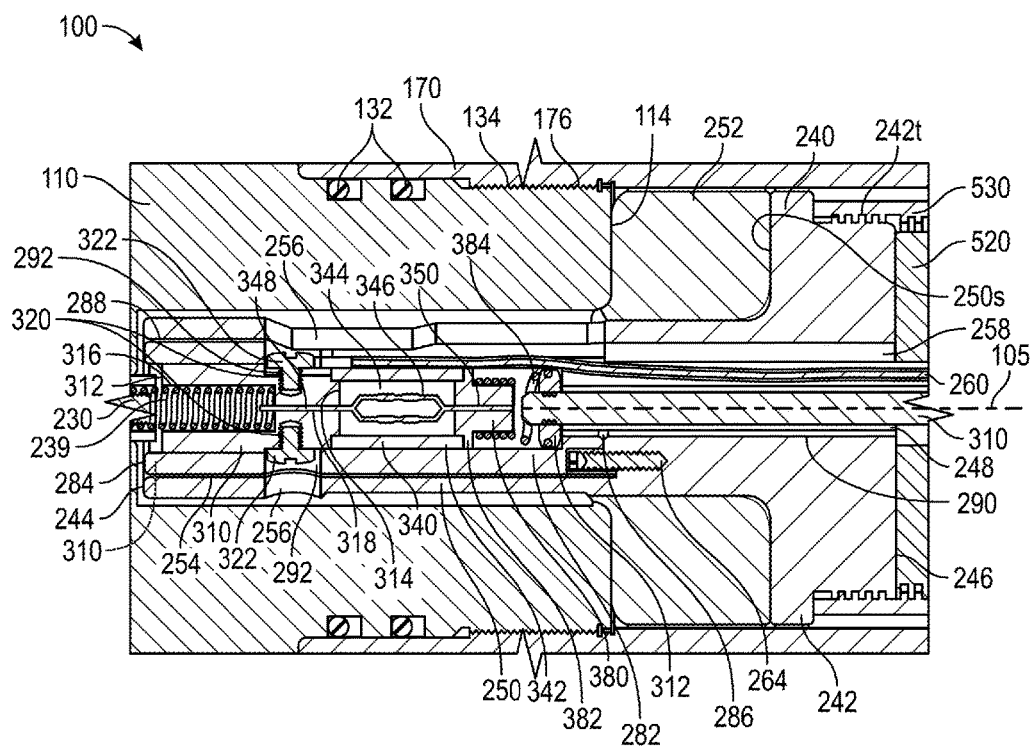
FIG. 8 is a zoomed-in view of an embodiment of a diode assembly of the casing collar locator of FIG. 1 in accordance with principles disclosed herein.
Figure 9:
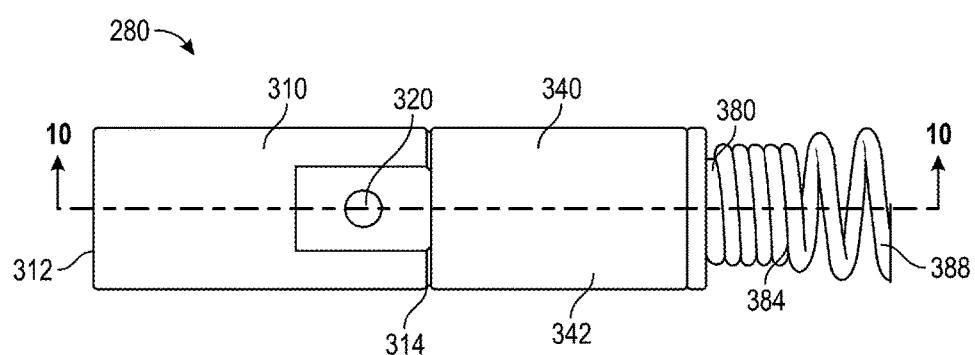
FIG. 9 is a side view of an embodiment of the diode assembly of the casing collar locator of FIG. 1.
Figure 10:
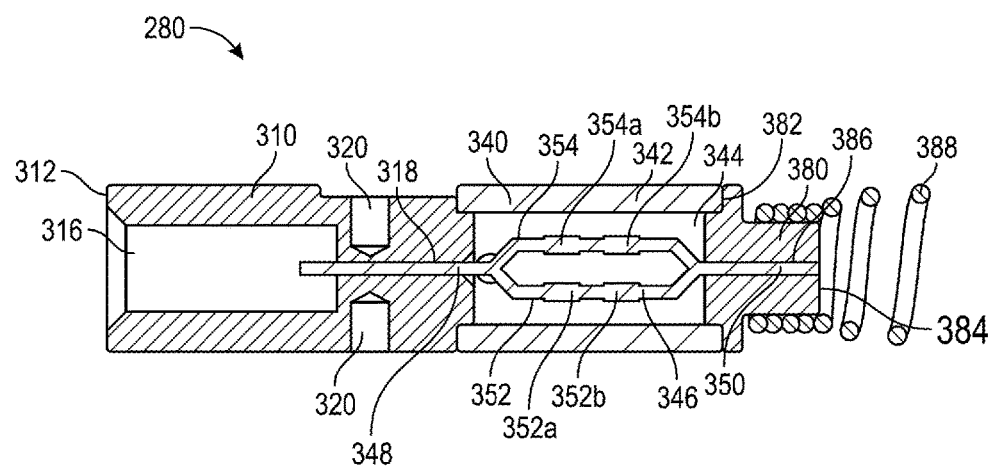
FIG. 10 is a side cross-sectional view along lines 10-10 of the diode assembly of FIG. 8.

As shown particularly in FIGS. 3 and 5, when CCL 100 is assembled another pressure bulkhead 200 is disposed within upper counterbore 150 of lower sub assembly 140. Particularly, annular shoulder 210s of insulating housing 210 is disposed adjacent annular shoulder 150s and threaded connector 222 of insulating housing 210 threadably couples with threaded connector 150t to secure pressure bulkhead 200 within lower sub assembly 140. Annular seals 224 seal against the inner surface 150i of counterbore 150. Further, when CCL 100 is coupled to direct connect sub 26 of tool string 20, an electrical pin contact 26p of direct connect sub 26 is inserted into bore 236 of electrical contact 230 to form an electrical connection between the direct connect sub 26 and CCL 100.

Referring to FIGS. 3-8, CCL 100 includes internal electrical and magnetic components configured to produce an electric signal in response to being displaced by a casing collar 14 of casing string 10, as described above. Particularly, CCL 100 includes an upper head sub assembly 240, a lower head sub assembly 400, and a coil assembly 500, each disposed coaxially with longitudinal axis 105 within housing 170 of CCL 100. Upper head sub assembly 240 is generally configured to electrically couple the pressure bulkhead 200 disposed within upper sub assembly 110 with the coil assembly 500, and to physically support coil assembly 500. Upper head sub assembly 240 generally includes an upper head sub 242 and a diode assembly 280 disposed therein. Upper head sub 242 has a first or upper end 244, a second or lower end 246, and a throughbore 248 extending therebetween. A threaded connector 242t is disposed on an outer surface of upper head sub 242 at lower end 246. Upper head sub 242 includes a neck 250 extending from upper end 244 and forming an annular shoulder 250s at an end thereof. An annular shock absorber 252 is disposed about neck 250 and is axially compressed between annular shoulder 250s of neck 250 and the lower end 114 of upper sub assembly 110. Shock absorber 252 is generally configured to absorb shock and other vibrations acting on CCL 100 from the operation of perforating guns 28 or other sources of vibration within wellbore 4. In this embodiment, shock absorber 252 is formed from silicone rubber and includes a plurality of flutes disposed on an outer surface thereof; however, in other embodiments shock absorber 252 may comprise other materials known in the art suitable for absorbing shocks and/or vibrations.

Upper head sub 242 of upper head sub assembly 240 further includes a counterbore 254 extending into upper head sub 242 from upper end 244. Counterbore 254 is configured to house diode assembly 280, and a pair of circumferentially spaced slots 256 extends through neck 250 to provide access to diode assembly 280. Upper head sub 242 also includes a slot 258 radially offset from throughbore 248 that extends axially between counterbore 254 and the lower end 246. Slot 258 is configured to provide for the passage of a coil cable 260 between the diode assembly 280 and the coil assembly 500. In this embodiment, coil cable 260 is sheathed within an acrylic fiberglass insulation sleeve to prevent coil cable 260 from shorting against the metallic components of CCL 100. Upper head sub 242 further includes a radially offset fastener 264 that extends into counterbore 254 to restrict relative rotation between upper head sub 242 and diode assembly 280.

Referring to FIGS. 8-11, diode assembly 280, disposed within counterbore 254 of upper head sub 242, is generally configured to protect electronic components from an excessive discharge of current from the coil assembly 500, and to prevent current generated by the coil assembly 500 from passing to the perforating guns 28 and other components of tool string 20 disposed below CCL 100. Diode assembly 280 generally includes an insulating housing 282, an upper end cap 310, a quad diode bridge package 340, and a lower end cap 380, where quad diode bridge package 340 is disposed between the upper end cap 310 and lower end cap 380, and each of these components is disposed in insulating housing 282.

Insulating housing 282 is generally configured to electrically insulate the upper end cap 310, lower end cap 380, and quad diode bridge package 340 from the surrounding upper head sub 242. In this embodiment, insulating housing 282 is formed from PEEK; however, in other embodiments insulating housing 282 may comprise other suitable electrically insulating materials. In this embodiment, insulating housing 282 is generally cylindrical and is disposed within counterbore 254 of upper head sub 242 and has a first or upper end 284 disposed at upper end 244 of upper head sub 242 and a second or lower end 286 disposed at the lower end of counterbore 254. Insulating housing 282 includes a first or upper bore 288 extending into insulating housing 282 from upper end 284 and a second or lower bore 290 extending from the lower end 286 of insulating housing 282, where the lower end of upper bore 288 intersects with the upper end of lower bore 290. In this embodiment, upper bore 288 is greater in diameter than lower bore 290. Upper bore 288 of insulating housing 282 houses the upper end cap 310, quad diode bridge package 340, and the lower end cap 380, while the lower bore 290 is configured to receive a terminal end of a contact rod 310 that extends into counterbore 254 of upper head sub 242. The lower end 286 of insulating housing 282 engages the set fastener 264 of upper head sub 242 to restrict relative rotation between upper head sub 242 and insulating housing 282. Insulating housing 282 also includes circumferentially spaced and radially extending slots 292 that provide access to upper end cap 310.

Upper end cap 310 is generally configured to provide an electrical connection between the coil assembly 500 and the quad diode bridge package 340, and between the pressure bulkhead 200 and the quad diode bridge package 340. In this embodiment, upper end cap 310 has a first or upper end 312, and a second or lower end 314 that forms an annular, downward facing shoulder. Upper end cap 310 generally includes first or upper bore 316 extending into the upper end cap 310 from first end 312, and a second or lower bore 318 extending into upper end cap 310 from lower end 314, where the lower end of upper bore 316 intersects or meets the upper end of lower bore 318. In this embodiment, upper bore 316 is greater in diameter than lower bore 318. The upper bore 316 of upper end cap 310 is configured to receive the contact spring 239 of pressure bulkhead 200, which extends into and engages the lower end of upper bore 316 to provide an electrical connection between the electrical contact 230 of pressure bulkhead 200 and the upper end cap 310. The lower bore 318 is configured to receive a first or upper lead 348 of the quad diode bridge package 340 to provide an electrical connection between the upper end cap 310 and the quad diode bridge package 340. In an embodiment, the upper lead 348 may be soldered into position within lower bore 318 to secure the upper lead 348 to the upper end cap 310.

In this embodiment, the upper end cap 310 also includes a plurality of circumferentially spaced, internally threaded apertures 320 that extend radially into an outer surface of upper end cap 310. Apertures 320 are each configured to receive a fastener 322 threadably disposed therein. As shown particularly in FIG. 8, fasteners 322 extend radially outwards from upper end cap 310 such that they are disposed within the radially extending slots 292 of insulating housing 282 to restrict movement between upper end cap 310 and insulating housing 282 and thereby couple the components of diode assembly 280 together. Further, one or more fasteners 322 are also coupled to a terminal end of coil cable 260 to provide an electrical connection between coil assembly 500 and the upper end cap 310. The terminal end of coil cable 260 may include a grounding terminal for coupling with one of the fasteners 322 to thereby effect an electrical connection between the fastener 322 and the coil cable 260.

Referring to FIGS. 3 and 8-11, in this embodiment, quad diode bridge package 340 includes a generally cylindrical insulating housing 342 having a sealed bore 344 disposed therein that includes a quad diode bridge 346. The sealed bore 344 is filled with flowable silicone to protect the quad diode bridge 346 disposed therein. In this embodiment, quad diode bridge 346 includes a first or upper lead 348, a second or lower lead 350. As shown particularly in FIGS. 10 and 11, quad diode bridge 346 also includes first and second branches 352 and 354 connected in parallel between upper and lower leads 348 and 350. First branch 352 of quad diode bridge 346 includes a plurality (e.g., two) of series-connected diodes 352a and 354b connected between the leads 348 and 350 with a positive polarity as shown. The anode (+) of diode 354a is connected to the upper lead 348 and its cathode is connected to the anode of diode 352b. The cathode (−) of diode 352b is connected to lower lead 350. The series-connected plurality of diodes 354a and 354b are connected with an opposite polarity to that of diodes 352a and 352b. Series-connected diodes 352a and 352b are configured to pass an electrical signal from the upper lead 348 to the lower lead 350 when the voltage on the upper lead 348 is positive and greater than a threshold (e.g., 1.7V) with respect to the lower lead 350. Similarly, series-connected diodes 352a and 352b are configured to pass an electrical signal from the lower lead 350 to the upper lead 348 when the voltage on the lower lead 350 is positive and greater than a threshold (e.g., 1.7V) with respect to the upper lead 348. In this arrangement, an electrical signal with either polarity may be passed through CCL 100 to fire the perforating guns 28 or other tools of tool string 20 disposed below the CCL 100.

Lower end cap 380 is generally configured to provide an electrical connection between the quad diode bridge 346 and contact rod 310. In this embodiment, lower end cap 380 has a first or upper end 382 that forms a flanged, upward facing annular shoulder, and a second or lower end 384. Lower end cap 380 generally includes a throughbore 386 extending between upper end 382 and lower end 384 that receives the lower lead 350 of the quad diode bridge 346 to provide an electrical connection between quad diode bridge 346 and the lower end cap 380. In an embodiment, the lower lead 350 may be soldered into position within throughbore 386 to secure the lower lead 350 to the lower end cap 380.

Lower end cap 380 also includes an electrical contact spring 388 that is disposed about and engages an outer surface of lower end cap 380. Contact spring 388 extends axially from the lower end 384 and engages a nut 312 that is coupled to a terminal end of contact rod 310, thereby forming an electrical connection between lower end cap 380 and contact rod 310. In this embodiment, contact spring 388 is configured to provide a biasing force against nut 312 sufficient to maintain an electrical connection therewith in wellbore service conditions. In this arrangement, quad diode bridge package 340 is disposed or sandwiched between upper end cap 310 and lower end cap 380. Particularly, an upper end of cylindrical insulating housing 342 engages the shouldered lower end 314 of upper end cap 310 and a lower end of cylindrical insulating housing 342 engages the shouldered upper end 382 of lower end cap 380.

Figure 12:
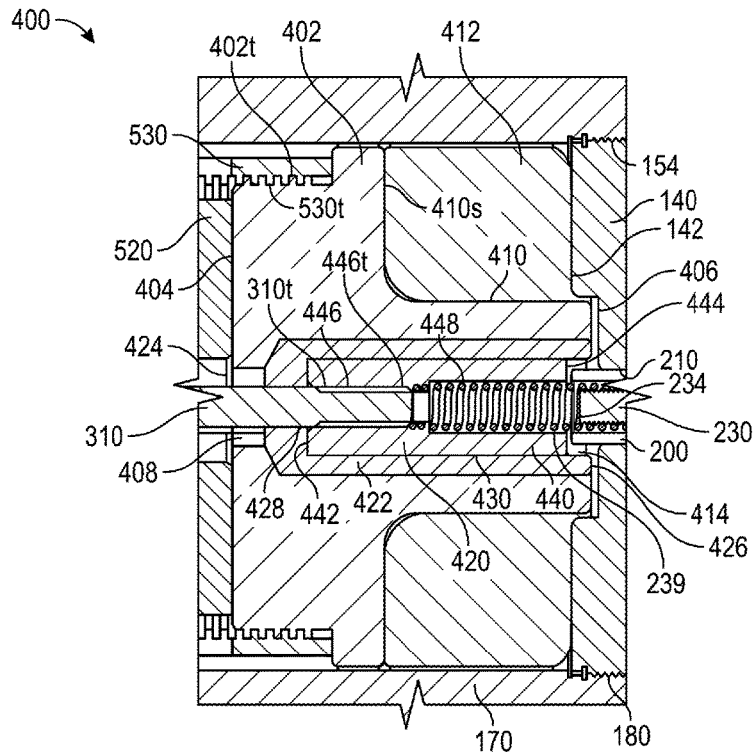
FIG. 12 is a zoomed-in view of an embodiment of an electrical contact assembly of the casing collar locator of FIG. 1 in accordance with principles disclosed herein.

Referring to FIGS. 3 and 12, lower head sub assembly 400 is generally configured to electrically couple the pressure bulkhead 200 disposed within lower sub assembly 140 with contact rod 310, and to physically support coil assembly 500 within housing 170. Lower head sub assembly 400 generally includes a lower head sub 402 and an electrical contact assembly 420 disposed therein. Lower head sub 402 has a first or upper end 404, a second or lower end 406, and a throughbore 408 extending therebetween. A threaded connector 402t is disposed on an outer surface of lower head sub 402 at upper end 404. Lower head sub 402 includes a neck 410 extending from lower end 406 and forming an annular shoulder 410s at an end thereof.

An annular shock absorber 412 is disposed about neck 410 and is axially compressed between annular shoulder 410s of neck 410 and the upper end 142 of lower sub assembly 140. Shock absorber 412 is generally configured to absorb shock and other vibrations acting on CCL 100 from the operation of perforating guns 28 or other sources of vibration within wellbore 4. In this embodiment, shock absorber 412 is configured similarly to shock absorber 252 described above. Lower head sub 402 of lower head sub assembly 400 also includes a counterbore 414 extending into lower head sub 402 from lower end 406. Counterbore 254 is configured to house electrical contact assembly 420.

Electrical contact or connector assembly 420 is generally configured to provide an electrical connection between contact rod 310 and the electrical contact 230 of the pressure bulkhead 200 disposed in the lower sub assembly 140. In this embodiment, electrical contact assembly 420 generally includes an insulating housing 422 and an electrical contact 440 disposed therein. Insulating housing 422 is generally configured to insulate contact rod 310 as it extends through throughbore 408 of lower head sub 402. In this embodiment, insulating housing 422 is formed from PEEK; however, in other embodiments insulating housing 422 may comprise other suitable electrically insulating materials. In this embodiment, insulating housing 422 is generally cylindrical and has a first or upper end 424 and a second or lower end 426. Insulating housing 422 includes a first or upper bore 428 extending into insulating housing 422 from upper end 424, and a second or lower bore 430 extending into insulating housing 422 from lower end 426, where lower bore 430 is greater in diameter than upper bore 428. Insulating housing 422 extends from the lower 406 of lower head sub 402 to the terminal end of counterbore 414. Upper bore 428 of insulating housing 422 is configured to support and guide the terminal end of contact rod 310 to prevent contact rod 310 from contacting the inner surface of throughbore 408 of lower head sub 402. Lower bore 430 is configured to receive electrical contact 440 disposed therein.

Electrical contact 440 of electrical contact assembly 420 is configured to provide an electrical connection between the contact spring 239 of pressure bulkhead 200 and the contact rod 310. In this embodiment, electrical contact is generally cylindrical and has a first or upper end 442 and a second or lower end 444. Electrical contact 440 includes a first or upper bore 446 extending into electrical contact 440 from upper end 442, and a second or lower bore 448 extending into electrical contact 440 from lower end 444. Upper bore 446 includes a threaded connector 446t disposed on an inner surface thereof and configured to threadably couple with a threaded connector 310t disposed on an outer surface of the terminal end of contact rod 310, thereby providing an electrical connection between contact rod 310 and the electrical contact 440. Lower bore 448 of electrical contact 440 is configured to receive contact spring 239 of pressure bulkhead 200, which engages a terminal end of lower bore 448 disposed within electrical contact 440, thereby establishing an electrical connection between contact spring 239 and electrical contact 440. In this embodiment, contact spring 239 is configured to provide a biasing force against electrical contact 440 sufficient to maintain an electrical connection therewith in wellbore service conditions. In this arrangement, an electrical signal may be passed from the electrical pin contact 24p of cable head 24 to the electrical pin contact 26p of direct connect sub 26 via contact rod 310.

Figure 11:
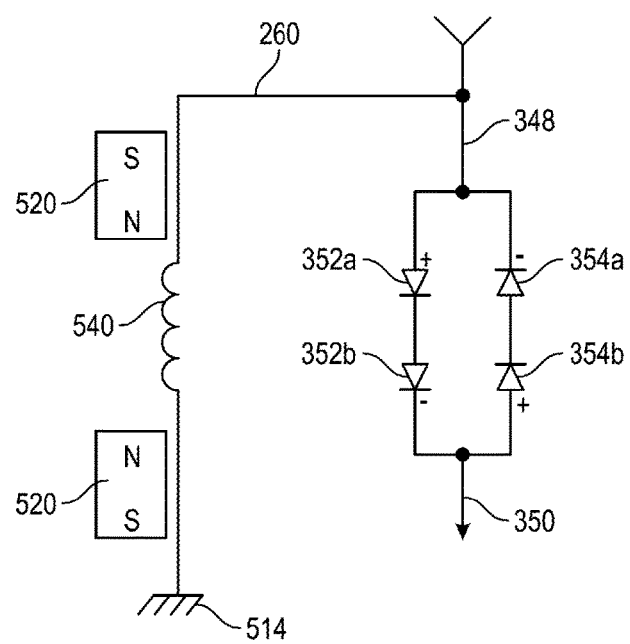
FIG. 11 is a schematic view of the diode assembly of FIG. 8.
Figure 13:
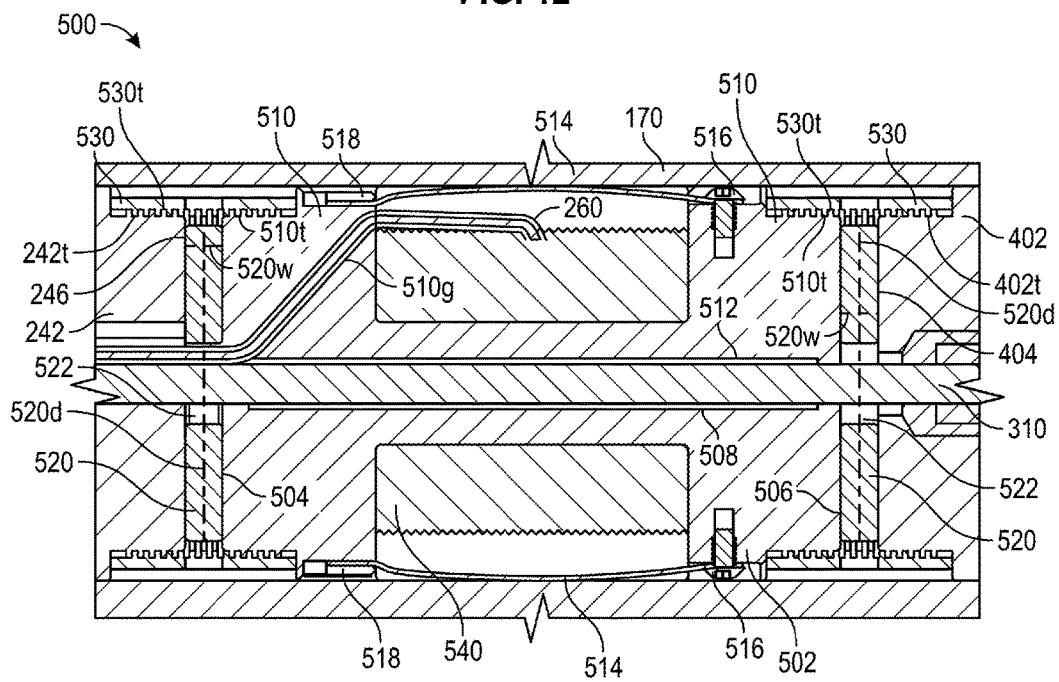
FIG. 13 is a zoomed-in view of an embodiment of a coil assembly of the casing collar locator of FIG. 1 in accordance with principles disclosed herein.

Referring to FIGS. 3, 11, and 13, coil assembly 500 is generally configured to provide a magnetic field having lines of flux arching around a coiled conductor such that distortions in the provided magnetic field are translated into a current passing through the coiled conductor, such as when the CCL 100 passes by a casing collar 14 of casing string 10, as described above. In this embodiment, coil assembly 500 generally includes a coil form 502, a pair of annular magnets 520, a pair of magnet sleeves 530, and a coil 540. Coil form 502 is configured to physically support the coil 540 and annular magnets 520, and couple with the upper head sub 242 and lower head sub 402. Coil form 502 may comprise SAE 12L14 carbon steel and may have insulating paper disposed therein to insulate coil 540 from coil form 502. In this embodiment, coil form 502 has a first or upper end 504, a second or lower end 506, and a throughbore 508 extending axially between upper end 504 and lower end 506. Coil form 502 includes a pair of radially extending annular flanges 510, with one annular flange 510 disposed at upper end 504 and one annular flange 510 disposed at lower end 506. The outer surface of each annular flange 510 includes a threaded connector 510t disposed thereon. In an embodiment, threaded connector 510t includes Acme threads similar to the thread type used in other downhole tools. In this arrangement, coil 540 is disposed axially between annular flanges 510 and radially about the outer surface of coil form 502.

The throughbore 508 of coil form 502 includes an insulating sleeve 512 disposed therein to prevent the outer surface of contact rod 310 from contacting the inner surface of throughbore 508 and thereby shorting out the electrical connection provided by contact rod 310. Coil form 502 also includes four circumferentially spaced grounding members 514 that extend axially between annular flanges 510. In this embodiment, grounding members 514 comprise leaf springs biased radially outwards into engagement with an inner surface of housing 170 to establish an electrical connection between coil form 502 and housing 170 to ground the coil 540 to the housing 170 of CCL 100. Particularly, the annular flange 510 at lower end 506 includes four circumferentially spaced fasteners 516 for coupling with a lower terminal end of a corresponding grounding member 514, and annular flange 510 at upper end 504 includes four circumferentially spaced, axially extending slots 518 for receiving an upper terminal end of a corresponding grounding member 514, thereby securing each grounding member 514 to coil form 502.

In this embodiment, each annular magnet 520 includes a central throughbore 522 to allow for the passage of contact rod 310 therethrough. In this embodiment, each magnet 520 has a diameter 520d that is greater than a width 520w of the annular magnet 520. The relative thinness of the width 520w of each annular magnet 520 reduces the overall length of CCL 100, allowing CCL 100 to navigate tight bends in deviated wellbores. Also, in this embodiment, magnets 520 each comprise a Neodymium NEH rated material; however, in other embodiments magnets 520 may comprise other suitable magnetic materials, such as samarium cobalt, alnico, and the like. A first or upper annular magnet 520 is disposed between upper head sub 242 and coil form 502 such that an upper surface of upper annular magnet 520 engages the lower end 246 of upper head sub 242 and a lower surface of upper annular magnet 520 engages the upper end 504 of coil form 502. A second or lower annular magnet 520 is disposed between coil form 502 and lower head sub 402 such that an upper surface of lower annular magnet 520 engages the lower end 506 of coil form 502 and a lower surface of lower annular magnet 520 engages the upper end 404 of lower head sub 402. Therefore, the coil 540 is disposed axially between the upper annular magnet 520 and the lower annular magnet 520, illustrated schematically in FIG. 11. Particularly, as illustrated schematically in FIG. 11, the North Pole of each annular magnet 520 is disposed proximal coil 540, with the South Pole of each annular magnet 520 disposed distal coil 540. In this arrangement, magnetic flux lines may pass between the upper annular magnet 520 and the lower annular magnet 520 while arching around coil 540.

Magnet sleeves 530 of coil assembly 500 are generally configured to threadably couple the upper head sub 242 and the lower head sub 402 to the coil form 502. In this embodiment, each magnet sleeve 530 includes a threaded connector 530t disposed on an inner surface thereof. In an embodiment, threaded connector 530t includes Acme threads, similar to the thread type used in other downhole tools. A first or upper magnet sleeve 530 threadably couples to the threaded connector 242t of upper head sub 242 and the threaded connector 510t of the upper annular flange 510 of coil form 502 via threaded connector 530t to couple upper head sub 242 to coil form 502. A second or lower magnet sleeve 530 threadably couples to the threaded connector 402t of lower head sub 402 and the threaded connector 510t of the upper annular flange 510 of coil form 502 via threaded connector 530t to couple upper head sub 242 to coil form 502.

In this embodiment, coil 540 of coil assembly 500 generally includes two separate wires wound in parallel about the portion of coil form 502 disposed between annular flanges 510. Each wire of coil 540 may be coated with varnish to insulate the wires of coil 540 from coil form 502. Coil 540 may be wound thousands of times about coil form 502 to provide a suitable electric signal in response to being passed by a casing collar 14 of casing string 10. In this embodiment, coil 500 comprises two parallel wires such that if one wire were to wear out or cease functioning during operation of CCL 100 the second, parallel wire may continue in operation such that CCL 100 may remain in operation and continue to perform its functions in the operation of tool string 20. Coil 540 electrically connects to diode assembly 280 via coil cable 260, which passes through the upper annular flange 510 of coil form 502 via a cable groove 510g extending therethrough.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure presented herein. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A casing collar locator, comprising:
    a housing having a first end, a second end, and a passage extending between the first end and the second end;
    a first cylindrical member having a passage extending therethrough and coupled to the first end of the housing, and a second cylindrical member having a passage extending therethrough and coupled to the second end of the housing;
    a coil assembly disposed in the passage of the housing and configured to produce an electrical signal in response to a change in a magnetic field;
    a first pressure bulkhead disposed in the passage of the first cylindrical member and comprising an annular seal to restrict fluid communication through the passage of the first cylindrical member; and
    a second pressure bulkhead disposed in the passage of the second cylindrical member and comprising an annular seal to restrict fluid communication through the passage of the second cylindrical member;
    wherein the first pressure bulkhead and the second pressure bulkhead each comprise an electrical connector disposed in an insulating housing having an outer surface configured to releasably couple with an inner surface of one of the first and second cylindrical members, and a contact spring coupled to the electrical connector that provides a biasing force against the electrical connector.

2. The casing collar locator of claim 1, wherein:
    the first cylindrical member comprises a plurality of circumferentially spaced inserts extending radially from an outer surface of the first cylindrical member; and
    the second cylindrical member comprises a plurality of circumferentially spaced inserts extending radially from an outer surface of the second cylindrical member.

3. The casing collar locator of claim 2, wherein the inserts of the first cylindrical member and the inserts of the second cylindrical member comprise tungsten carbide.

4. The casing collar locator of claim 1, wherein the coil assembly comprises an annular magnet having a diameter greater than an axial width of the annular magnet.

5. The casing collar locator of claim 4, wherein the annular magnet comprises Neodymium.

6. The casing collar locator of claim 1, wherein the coil assembly comprises two wires wound in parallel about a coil form.

7. The casing collar locator of claim 1, further comprising a diode assembly electrically connected to the coil assembly, wherein the diode assembly comprises:
 a first lead and a second lead;
 a first plurality of series-connected diodes connected with a positive polarity between the first and second leads; and
 a second plurality of series-connected diodes connected with a negative polarity between the first and second leads and in parallel with the first plurality of series-connected diodes.

8. The casing collar locator of claim 1, wherein the annular seal of the first pressure bulkhead comprises a first annular seal positioned radially between an outer surface of the electrical connector and an inner surface of the insulating housing of the first pressure bulkhead, and wherein the first pressure bulkhead comprises a second annular seal positioned radially between the inner surface of the first cylindrical member and the outer surface of the insulating housing of the first pressure bulkhead.

9. A casing collar locator, comprising:
 a housing having a first end, a second end, and a passage extending between the first end and the second end;
 a first cylindrical member having a passage extending therethrough and coupled to the first end of the housing, and a second cylindrical member having a passage extending therethrough and coupled to the second end of the housing;
 a coil assembly disposed in the passage of the housing and configured to produce an electrical signal in response to a change in a magnetic field;
 a first pressure bulkhead disposed in the passage of the first cylindrical member and comprising an annular seal to restrict fluid communication through the passage of the first cylindrical member; and
 a second pressure bulkhead disposed in the passage of the second cylindrical member and comprising an annular seal to restrict fluid communication through the passage of the second cylindrical member;
 wherein the first cylindrical member comprises a plurality of circumferentially spaced inserts extending radially from an outer surface of the first cylindrical member;
 wherein the second cylindrical member comprises a plurality of circumferentially spaced inserts extending radially from an outer surface of the second cylindrical member;
 wherein the first pressure bulkhead and the second pressure bulkhead each comprise an electrical connector and a contact spring coupled to the electrical connector that provides a biasing force against the electrical connector, and wherein a contact rod extends centrally through the coil assembly and is electrically connected to the contact springs of the first and second pressure bulkheads.

10. The casing collar locator of claim 9, wherein the inserts of the first cylindrical member and the inserts of the second cylindrical member comprise tungsten carbide.

11. The casing collar locator of claim 9, wherein the coil assembly comprises an annular magnet having a diameter greater than an axial width of the annular magnet.

12. The casing collar locator of claim 9, wherein the coil assembly comprises two wires wound in parallel about a coil form.

13. The casing collar locator of claim 9, wherein the coil assembly comprises:
 a coil form having a coil wrapped around the coil form; and
 a plurality of circumferentially spaced grounding members coupled to the coil form, wherein the grounding members are biased into engagement with the housing.

14. A casing collar locator, comprising:
 a housing having a first end, a second end, and a passage extending between the first end and the second end;
 a first cylindrical member having a passage extending therethrough and coupled to the first end of the housing, and a second cylindrical member having a passage extending therethrough and coupled to the second end of the housing;
 a first pressure bulkhead disposed in the passage of the first cylindrical member and comprising an annular seal to restrict fluid communication through the passage of the first cylindrical member;
 a second pressure bulkhead disposed in the passage of the second cylindrical member and comprising an annular seal to restrict fluid communication through the passage of the second cylindrical member; and
 a coil assembly disposed in the passage of the housing and configured to produce an electrical signal in response to a change in a magnetic field, wherein the coil assembly comprises an annular magnet having a diameter greater than an axial width of the annular magnet, and wherein the magnet comprises a north pole and a south pole, the north pole being positioned between a coil of the coil assembly and the south pole;
 wherein the first pressure bulkhead and the second pressure bulkhead each comprise an electrical connector disposed in an insulating housing having an outer surface configured to releasably couple with an inner surface of one of the first and second cylindrical members, and a contact spring coupled to the electrical connector that provides a biasing force against the electrical connector.

15. The casing collar locator of claim 14, wherein the annular magnet comprises Neodymium.

16. The casing collar locator of claim 14, wherein:
 the first cylindrical member comprises a plurality of circumferentially spaced inserts extending radially from an outer surface of the first cylindrical member; and
 wherein the second cylindrical member comprises a plurality of circumferentially spaced inserts extending radially from an outer surface of the second cylindrical member.

17. The casing collar locator of claim 16, wherein the inserts of the first cylindrical member and the inserts of the second cylindrical member comprise tungsten carbide.

18. The casing collar locator of claim 14, wherein the coil assembly comprises two wires wound in parallel about a coil form.

19. The casing collar locator of claim 14, wherein the first cylindrical member comprises a threaded connector having Acme threads for coupling the casing collar locator to a tool.

20. The casing collar locator of claim 14, wherein the annular seal of the first pressure bulkhead comprises a first annular seal positioned radially between an outer surface of the electrical connector and an inner surface of the insulating housing of the first pressure bulkhead, and wherein the first pressure bulkhead comprises a second annular seal positioned radially between the inner surface of the first cylindrical member and the outer surface of the insulating housing of the first pressure bulkhead.

\* \* \* \* \*